(12) United States Patent
Butussi et al.

(10) Patent No.: US 8,351,526 B2
(45) Date of Patent: Jan. 8, 2013

(54) INTERPOLATED CHANNEL ESTIMATION FOR MOBILE OFDM SYSTEMS

(75) Inventors: Matteo Butussi, Grand Saconnex (CH); Stevano Tomasin, Padova (IT)

(73) Assignee: Abilis Systems SARL, Plan-Les-Ouates (CH)

(*) Notice: Subject to any disclaimer, the term of this patent is extended or adjusted under 35 U.S.C. 154(b) by 0 days.

(21) Appl. No.: 13/182,762

(22) Filed: Jul. 14, 2011

(65) Prior Publication Data

US 2012/0020427 A1 Jan. 26, 2012

Related U.S. Application Data

(63) Continuation of application No. PCT/EP2010/050498, filed on Jan. 18, 2010.

(30) Foreign Application Priority Data

Jan. 16, 2009 (EP) .................................. 09150802

(51) Int. Cl.
*H04L 27/28* (2006.01)
(52) U.S. Cl. ........ 375/260; 375/259; 375/316; 375/340; 375/346; 375/347; 375/348
(58) Field of Classification Search .................. 375/260, 375/259, 316, 340, 346, 347, 348
See application file for complete search history.

(56) References Cited

U.S. PATENT DOCUMENTS

| | | | | |
|---|---|---|---|---|
| 6,907,026 B2* | 6/2005 | Akiyama | ....................... | 370/344 |
| 6,990,153 B1* | 1/2006 | Farhang-Boroujeni et al. | ............... | 375/260 |
| 7,440,503 B2* | 10/2008 | Hoshi | ....................... | 375/240.25 |
| 7,894,331 B2* | 2/2011 | Sadek et al. | ................... | 370/210 |
| 7,995,676 B2* | 8/2011 | Fite et al. | ....................... | 375/316 |
| 7,995,688 B2* | 8/2011 | Hong et al. | ................... | 375/346 |
| 8,121,204 B2* | 2/2012 | Anderson et al. | ............. | 375/260 |
| 2005/0213680 A1* | 9/2005 | Atungsiri et al. | ............. | 375/260 |
| 2006/0269016 A1* | 11/2006 | Long et al. | ..................... | 375/340 |

(Continued)

FOREIGN PATENT DOCUMENTS

EP 2051425 A1 4/2009

(Continued)

OTHER PUBLICATIONS

Baoguo Yang et al: "Channel Estimation for OFDM Transmission in Multipath Fading Channels Based on Parametric Channel Modeling", IEEE Transactions on Communications, vol. 49, No. 3, Mar. 1, 2001, XP011009895, ISSN: 0090-6778, Section III, figure 1.

(Continued)

*Primary Examiner* — Kenneth Lam
(74) *Attorney, Agent, or Firm* — Pearne & Gordon LLP

(57) ABSTRACT

In an OFDM system using pilot cells for channel estimation, time interpolation among pilot cells of different OFDM symbols is commonly used to improve the estimate. The estimated channel impulse response is also windowed to further reduce noise and disturbances. However, for a transmission over a time-varying channel, suboptimal time interpolation, implemented with a filter having only a few taps not matched to the maximum Doppler frequency, degrades channel estimation. As aliases can lead to an erroneous estimate of channel duration and consequent errors in windowing, the present invention implements a technique to detect aliases and correct the estimate of channel duration. Parameters of the detection techniques are optimized by an analysis that provides closed-form expressions of the false alarm and miss detection probabilities.

6 Claims, 12 Drawing Sheets

U.S. PATENT DOCUMENTS

| | | | |
|---|---|---|---|
| 2007/0041116 A1* | 2/2007 | Kajiwara | 360/51 |
| 2007/0076804 A1* | 4/2007 | Sestok et al. | 375/260 |
| 2007/0211827 A1* | 9/2007 | Baggen et al. | 375/316 |
| 2008/0049598 A1* | 2/2008 | Ma et al. | 370/208 |
| 2008/0225936 A1* | 9/2008 | Hong et al. | 375/230 |
| 2008/0260052 A1* | 10/2008 | Hayashi | 375/260 |
| 2009/0180558 A1* | 7/2009 | Ma et al. | 375/260 |
| 2010/0040154 A1* | 2/2010 | Carbonelli et al. | 375/260 |

FOREIGN PATENT DOCUMENTS

| | | |
|---|---|---|
| WO | 02/067527 A2 | 8/2002 |
| WO | 2008/084784 A2 | 8/2002 |
| WO | 2001/117381 A1 | 12/2005 |

OTHER PUBLICATIONS

Minn, H. et al.: "An Investigation Into Time-Domain Approach for OFDM Channel Estimation", IEEE Transactions on Broadcasting, vol. 46, No. 4, Dec. 1, 2000, XP011006138, ISSN: 0018-9316, Sections III-V.

ETCI publication A122, "Frame structure channel coding and modulation for a second generation digital terrestrial television broadcasting system" (DVB-T2), Jun. 2008.

Timothy M. Schmidl and Donald C. Cox: "Robust Frequency and Timing Synchronization for OFDM", published on IEEE Trans. Communications, vol. 45, No. 12, pp. 1613-1621, Dec. 1997.

Bo Ai, Zhi-xing Yang, Chang-yong Pan, Jian-hua Ge, Yong Wang and Zhen Lu: "On the Synchronization Techniques for Wireless OFDM Systems", published in IEEE Trans. Broadcasting, vol. 52, No. 5, pp. 236-244, Jun. 2006.

P. Hoeher, S Kaiser and P. Robertson: "Two-dimensional pilot-symbol aided channel estimation by Wiener Filtering" in Proc. IEEE Int. Conf. Acoustics, Speech and Signal Processing (ICASSP), pp. 1845-1848, Apr. 1997.

Xiaodai Dong, Wu-Sheng Lu and Anthony C. K. Soong: "Linear Interpolation in pilot symbol assisted channel estimation for OFDM" ,IEEE Trans. Wireless Commun., vol. 6, No. 5, pp. 1910-1920, May 2007.

International Search Report for PCT/EP2010/050498 dated Oct. 18, 2010.

* cited by examiner

INTERPOLATED CHANNEL ESTIMATION FOR MOBILE OFDM SYSTEMS

REFERENCE DATA

This application claims priority of European patent application EP09150802 of Jan. 16, 2009, the contents whereof are hereby incorporated.

FIELD OF THE INVENTION

The present invention concerns a method and a device for estimating channel impulse response in an OFDM receiver or in an OFDM system, as well as a receiver comprising such device or implementing such method.

DESCRIPTION OF RELATED ART

Orthogonal Frequency Division Multiplexing modulation (OFDM or COFDM) is a digital multi-carrier modulation method in which the transmitted data is divided into several parallel channels, which are carried by a large number of closely-spaced orthogonal sub-carriers.

OFDM is increasingly employed in wired or wireless wideband digital communication, also thanks to its ability to accommodate with variable or poor channel conditions.

Among others, OFDM schemes are used in broadband interned (DSL) and digital television and audio broadcasting (DVB and DAB). In the following reference will be made, to exemplify the invention, to the DVB standard, as described ETSI standard EN 300 744, EN 302 304, EN 300, N 301 192; EN 300 421 and in ETCI publication A122, *"Frame structure channel coding and modulation for a second generation digital terrestrial television broadcasting system"* (DVB-T2), which are hereby incorporated. It must be intended, however, that this is not a limiting feature of the invention, which includes OFDM modulation systems, be they used for broadcast or data transmission, on a radio channel, or on a wired channel, or in any other suitable transmission channel. The present invention could be applied to other digital television system, and also to wireless networks (HIPERLAN, WiMax), digital radio systems, ADSL, VDSL and PLC data networks, and so on.

In a typical OFDM system, schematically represented in FIG. 1, the transmitter maps the data bits on to symbols belonging to defined symbol constellation of the appropriate modulation scheme (e.g. QPSK, 16-QAM or 64-QAM), at rate 1/T. There are then grouped into OFDM frames of size N. In particular the notation $x_n(u)$, n=0, 1, ..., N−1 shall represent the symbol n of the frame u. In OFDM modulation, each of the elements $x_n(u)$ of one OFDM frame U is transmitted by sub-carrier number n.

This is performed by an N-size inverse Fourier Transform (IFFT) in block 32. In order to reduce the complexity of the receiver the modulated data are completed (block 33) by a cyclic prefix (CP) (i.e., the last $L_{CP}$ symbols of the IFFT output are replicated at the beginning of the OFDM-modulated frame before transmission). The transmission rate is $1/T_s = (N+L_{CP})/NT$. The signal is transferred to the receiver by a suitable channel (block 35).

At the receiver, the received signal is split, by detecting the repetition of the cyclic prefix, into frames of size N+$L_{CP}$, corresponding to the transmitted frames. The first $L_{CP}$ samples (corresponding to the CP) are discarded (block 43) and the following N samples are transformed with a fast Fourier Transform (FFT, block 42) to obtain the symbol $y_n(u)$ for frame u at sub-carrier n, with n=0, 1, ..., N−1. The rate of $y_n(u)$ is N/T.

For dispersive channels the detection and selection of N samples on which one perform the FFT is a critical task. Such task will be named synchronization. In the state of the art, Synchronization is usually performed using techniques based on time-domain-autocorrelation of the received signal, as disclosed, for example, In the papers *"Robust Frequency and Timing Synchronization for OFDM"*, of Timothy M. Schmidl and Donald C. Cox, published on IEEE Trans. Communications, vol. 45, No 12, pp. 1613-1621, December 1997 and *"On the Synchronization Techniques for Wireless OFDM Systems"*, by Bo Ai, Zhi-xing Yang, Chang-yong Pan, Jian-hua Ge, Yong Wang and Zhen Lu, published in IEEE Trans. Broadcasting, vol. 52, No 5, pp 236-244, June 2006. The synchronization has to detect the beginning of each OFDM frame and it has to select a good set of N consecutive samples to perform the FFT. The N samples have not to be affected by Inter-Symbol-Interference (ISI). Nevertheless ISI can be zero only if the maximum channel delay is smaller than the CP-length. Nevertheless when the maximum channel delay is larger than CP-length, then ISI cannot be avoided and the objective is to minimize it. FIG. 2 shows the N consecutive samples chosen by synchronization; the position of the first sample is named Cutting Point Position.

Indicating with $Y(u) = [y_0(u), y_1(u), \ldots, y_{N-1}(u)]^T$ the N-size vector of received samples for the frame u, where T denotes transposition and with $X(u) = [x_0(u), x_1(u), \ldots, x_{N-1}(u)]^T$ be the N-size vector of the transmitted symbols for the frame u the received signal is equal to:

$$Y(u) = H(u)X(u) + W(u), \qquad (1)$$

where H(u) is a matrix of size N×N containing the channel frequency response of channel 35 and $W(u) = [w_0(u), w_1(u), \ldots, w_{N-1}(u)]^T$ is the noise vector. The receiver needs a reasonable estimate of H(u) to detect the transmitted symbol, with coherent modulations. To this end some sub-carriers are reserved for the transmission of symbols that are known at the receiver and will be used to estimate the channel frequency response. There sub-carriers are called pilots tones. The size and structure of these OFDM frames, and the position of pilots, are specified by different modulation standards, for example DVB-T, DVB-T2, DVB-M, DAB and so on. The details of DVB implementation are defined by ETSI standards mentioned above.

FIG. 4 shows the pilots position in frequency and time domain for DVB-T Standard, see ETSI standard EN 300 744. In DVB-T the distance between two consecutive pilots of the same OFDM frame is 12 sub-carrier, $S_B$=12. For any new transmitted OFDM frame the pilot's position is circularly shifted in frequency by 3 sub-carriers. This implies that after 4 OFDM frame (Z=4) the position of all the sub-carriers returns to be the same. FIG. 4 can be easily generalized for any $S_B \neq 12$ and for any Z≠4.

FIG. 6 shows one of the possible scattered pilot patterns for DVB-T2. In this case $S_B$=12 and Z=2.

In the following, the pilot pattern of the u-th OFDM frame will be denoted by p(u). p(u) contains the indices of the sub-carriers carrying pilot tones. p(u) can be written in a vector form as follows:

$$p(u) = [p_0(u); \ldots; p_{L_s-1}(u)], \qquad (2)$$

where $L_s$ is the length of the p(u) vector. $L_s$ and p(u) can significantly change according to the modulation standard, OFDM frame and configuration. The examples presented in the present specification will refer principally to the DVB-T standard, for concision's sake. It must be understood, however, that the present invention is not so limited and covers all the modulation and encoding systems to which it applies.

In the state of the art have been proposed several methods for estimating the channel frequency response from the pilot signals including: Least Square (LS) method; Minimum Mean Square Error (MMSE) estimates; and other methods based on Singular Value Decomposition (SVD). These techniques give a channel estimate only at pilot positions. Once a channel estimate is available on pilots, interpolation and smoothing is used to derive the channel estimates on the other sub-carriers. It is known in the art to interpolate the channel response with 2-D Wiener Filtering that exploits the time and frequency correlation properties of the channel, for example as disclosed in articles "*Two-dimensional pilot-symbol aided channel estimation by Wiener Filtering*" by P. Hoeher, S. Kaiser and P. Robertson, in Proc. IEEE Int. Conf. Acoustics, Speech and Signal Processing (ICASSP), pp 1845-1848 and "*Linear Interpolation in pilot symbol assisted channel estimation for OFDM*" of Xiaodai Dong, Wu-Sheng Lu and Anthony C. K. Soong, IEEE Trans. Wireless Commun., vol. 6, no. 5, pp. 1910-1920, May 2007.

It is also known, as schematically represented in FIG. 3, that a simple cascade of a time interpolator 10 and a frequency interpolator 11 provides, with less complexity, an acceptable channel estimate in many practical applications.

BRIEF SUMMARY OF THE INVENTION

According to the invention, these aims are achieved by means of the method and device that are object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
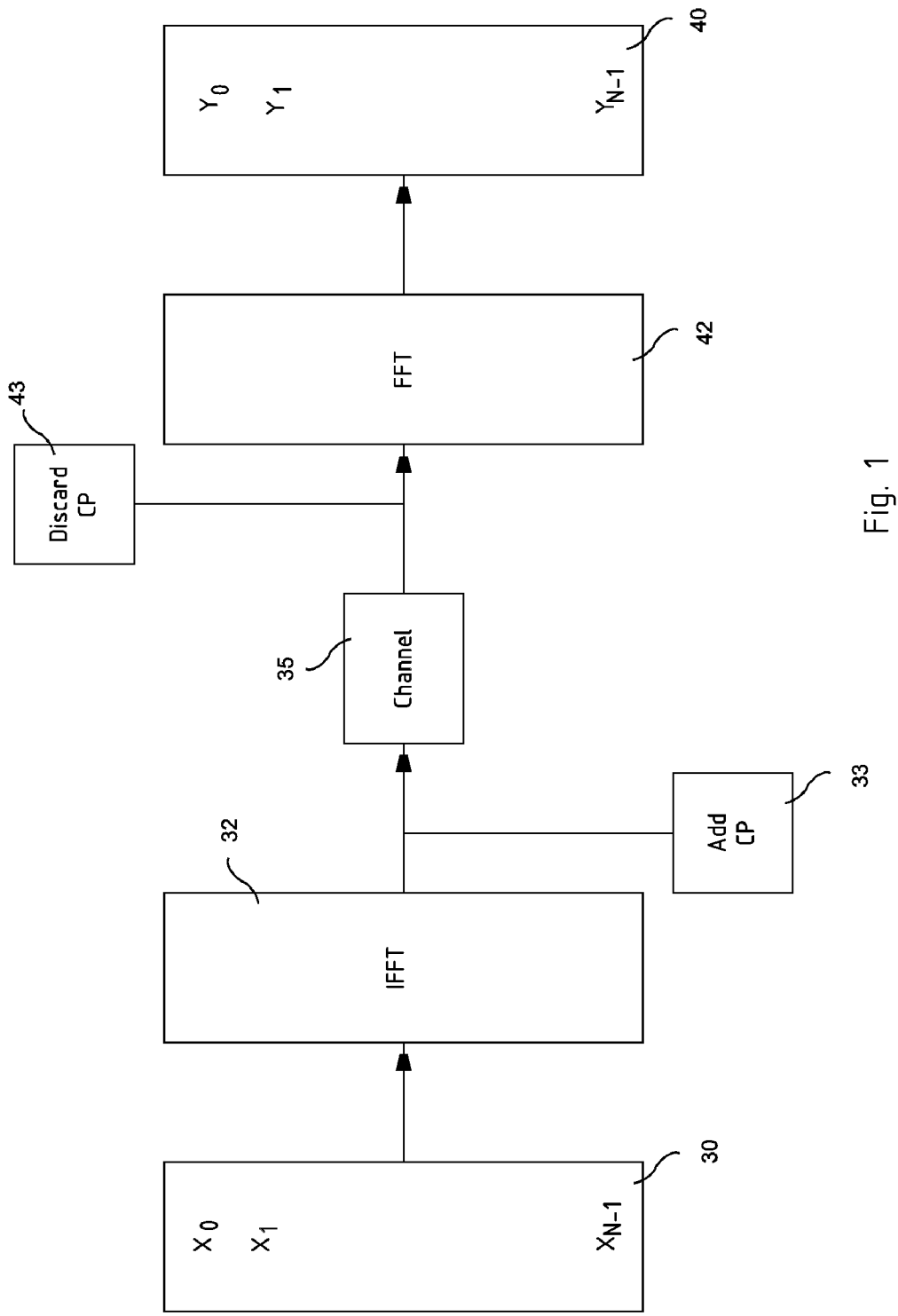
FIG. 1 schematically shows an OFDM System; the processing implemented by the transmitter: block 32 and block 33; the effect of the environment: block 35 and the processing implemented by the receiver: block 43 and block 42.
Figure 2:
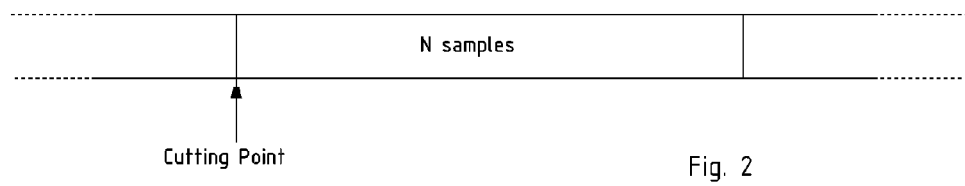
FIG. 2 shows the selection of M consecutive samples of the received stream. The position of the first sample is named Cutting point Position. Such samples are selected in the synchronization task of a generic OFDM receiver.

From a formal standpoint, an OFDM system can be modelled as follows: Consider an OFDM system transmitting on the channel at rate 1/T. OFDM frame u comprises N cells $X_n(u)$, n=0, 1, ..., N−1, carrying complex data symbols, that are transformed into the time domain by inverse discrete Fourier transform (IDFT) to obtain $$x_p(u) = \frac{1}{\sqrt{N}} \sum_{n=0}^{N-1} e^{2\pi j \frac{pn}{N}} X_n(u), \quad (3)$$

where $j=\sqrt{-1}$ and p=0, 1, ..., N−1 Each time domain block is extended with a cyclic prefix (CP) of size $L_{CP}$ that avoids interference among transmitted blocks and allows frequency domain equalization. After CP insertion we obtain the block of size P=N+$L_{CP}$, with elements $$s_p(U) = \begin{cases} x_{N-L_{CP}+p}(u) & p = 0, 1, \ldots, L_{CP} - 1 \\ x_{p-L_{CP}}(u) & p = L_{CP}, L_{CP}+1, \ldots, P-1, \end{cases} \quad (4)$$

which is transmitted on the channel.

We consider the equivalent sampled channel, obtained by the cascade of the transmit interpolating filter, the continuous time channel and the receive sampling filter. In general, the channel is time-varying due to the mobility of transmit/receiver or surrounding objects. The resulting sampled channel impulse response (CIR) at time nT is denoted $\{h_l(n)\}$, with l=0, 1, ..., L−1. As widely considered in wireless broadcast literature, channel taps $\{h_l(n)\}$ are modelled as independent with zero mean and variance $\sigma_h^2(l)$, while time variations are described by the Jakes model, providing the following correlation for tap l at delay δT $$\rho'_l(\delta) = E[H_l(n)h^*_l(n-\delta)] = \sigma_h^2(l) J_0(2\pi f_D T |\delta|), \quad (5)$$

where E[•] denotes expectation, $f_D$ is the maximum Doppler frequency and $J_0(\cdot)$ is the Bessel function of order zero. This model includes a Single Frequency Network (SFN) scenario where the signal is broadcast by multiple transmitters: $\sigma_h^2(l)$ is the sum of the power profiles of each channel, with suitable delays.

At the receiver, after proper synchronization, the signal is split into blocks of P samples and element p=0, 1, ..., P−1, of frame u is $$r_p(u) = \sum_{l=0}^{L-1} h_l(uP+p)s_{p-l}(u) + w_p(u), \quad (6)$$

where $w_p(u)$ is an additive white Gaussian noise term with zero mean and variance $\sigma_w^2$, compactly denoted as $w_p(u) \sim N(0, \sigma_w^2)$ and L is the number of channel path. The CP part of $r_p(u)$, with indices p=0, 1, ..., $L_{CP}$−1, is discarded and a discrete Fourier transform (DFT) is applied on vector $\{r_p(u)\}$, p=$L_{CP}$, $L_{CP}$+1, ..., P−1. For a transmission over a time invariant dispersive channel, the output of the DFT is a noisy and scaled version of the transmitted OFDM data symbol. In this case equalization boils down to an element-wise multiplication of DFT outputs. In the more general case of time-varying channels, interference among samples of an OFDM data symbol arises. Let the average channel for OFDM symbol u be $$\bar{h}_l(u) = \frac{1}{N} \sum_{n=0}^{N-1} h_l(uP + L_{CP} + n), \quad (7)$$

with l=0, 1, ..., L−1, and the corresponding N-size DFT be $$\bar{H}_n(u) = \frac{1}{\sqrt{N}} \sum_{l=0}^{L-1} e^{-2\pi j \frac{ln}{N}} \bar{h}_l(u), \quad (8)$$

with n=0, 1, ..., N−1. Due to time-variations of the channel within each OFDM symbol, inter-carrier interference (ICI) arises. Then, the demodulated OFDM symbol can be written as $$R_n(u) = \frac{1}{N} \sum_{p=0}^{N-1} e^{-2\pi j \frac{np}{N}} r_{L_{CP}+p}(u) = \bar{H}_n(u)X_n(u) + W_n(u), \quad (9)$$

where n=0, 1, ..., N−1, $W_n(u)$ accounts both for noise (as DFT of $w_p(u)$, p=$L_{CP}$, $L_{CP}$+1, ..., P−1) and for ICI.

The received samples are then passed to a demodulator/demapper to obtain either hard or soft information on bits. In both cases, channel estimate is needed to correct the phase and to compensate for the amplitude (hard decision) or compute the likelihood ratio of each bit (soft decision) to be passed to the decoder. Hence, it is essential to have an estimate of $\bar{H}_n(u)$.

Figure 3:
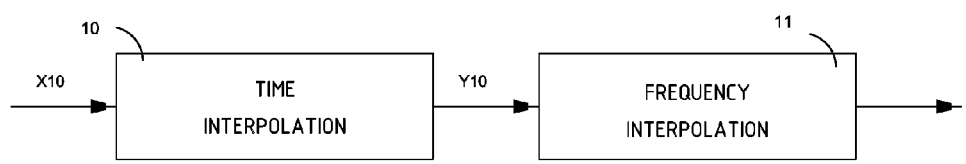
FIG. 3 This figure shows, in a schematic block fashion, one of the possible ways to organize channel estimation in a OFDM receiver. The input of the entire unit reported in this figure is the channel frequency response estimated at the pilot tone positions, while the output is the channel frequency response estimated of all the sub-carriers of an OFDM frame. The channel estimator is based on the cascade of two 1-D estimator, the first one working in time domain (block 10) and the second one working in frequency domain (block 11).

With reference to FIG. 3, and assuming that the system is processing a signal according to the DVB-T standard, the input of block 10, denoted by X10, is the channel estimated every 12 sub-carriers. X10 can be generated used one of the above mentioned algorithms as: LS, MMSE and SVD. X10 is the channel estimation in the frequency domain for the generic OFDM frame at the pilot tone positions.

In DVB-T the output of the Time Interpolation, denoted by Y10, is the channel estimated every 3 sub-carrier. This processing is described by FIG. 5. Assume that the OFDM frame u has a pilot tone at the sub-carrier $\bar{n}$, from FIG. 4 it follows that even the OFDM frame u+Z has a pilot tone at the same sub-carrier. The time interpolator 10 uses the estimation of the channel at the sub-carrier $\bar{n}$ done using the OFDM frame u+Z and u to estimate the channel at the same sub-carrier but for the OFDM frames u+1, ..., u+Z−1. This can be generalized saying that block 10 uses a set of channel estimations at sub-carrier $\bar{n}$ to estimate the channel at the same sub-carrier for OFDM frames in which no pilot tones are present at the position $\bar{n}$.

Figure 4:
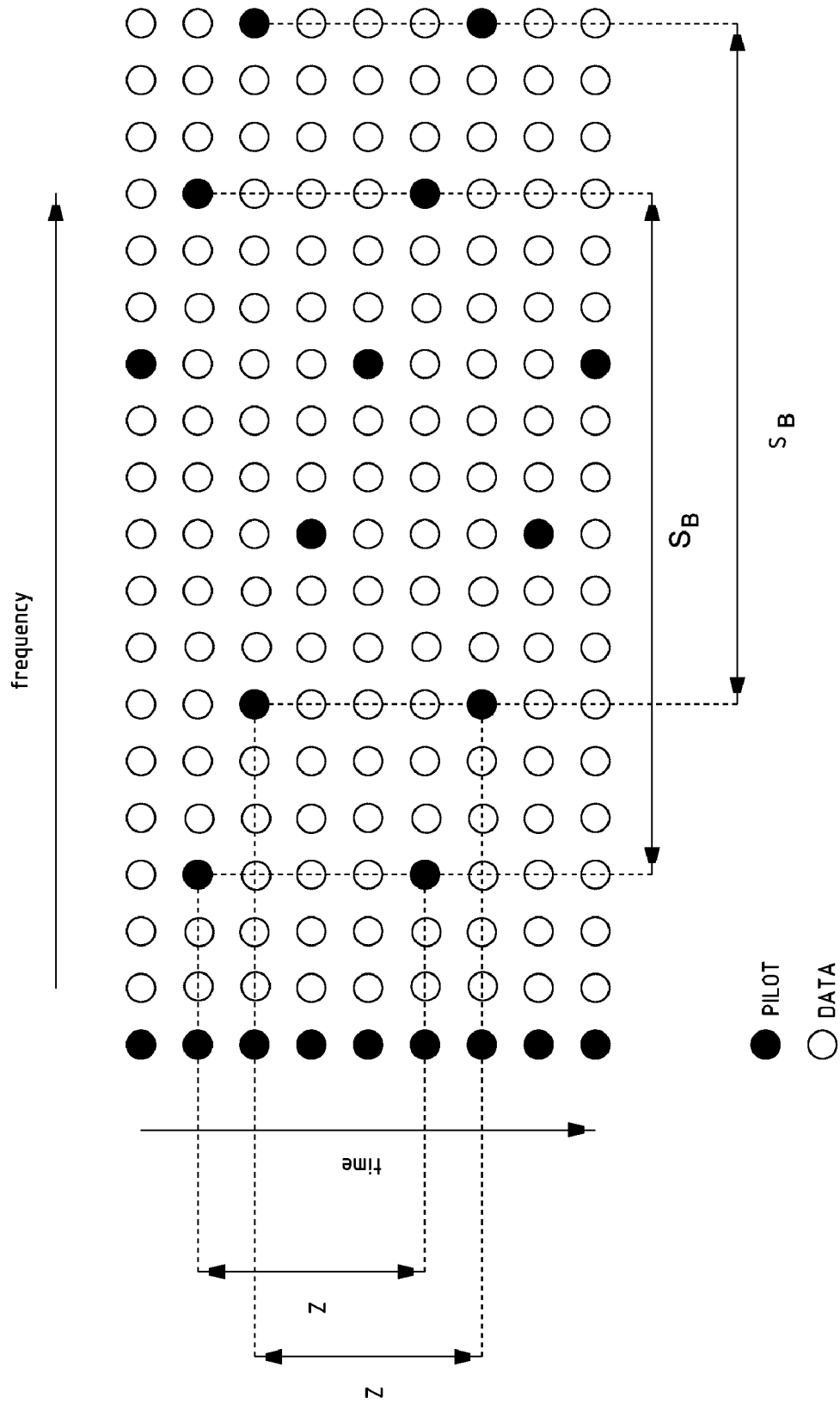
FIG. 4 shows in a schematic fashion a generalized pilot pattern for OFDM systems. Z is the distance, in time domain and expressed in OFDM frame number, between two consecutive OFDM frame pilot tones at the same sub-carrier positions. $S_B$ is the distance, in frequency domain and expressed in sub-carrier number, between two consecutive sub-carriers carrying pilot tones.

Using the generalization described by FIG. 4, X10 is the channel estimated every $S_B$ sub-carriers while Y10 is the channel estimated every $S_B/Z$ sub-carriers.

Figure 7:
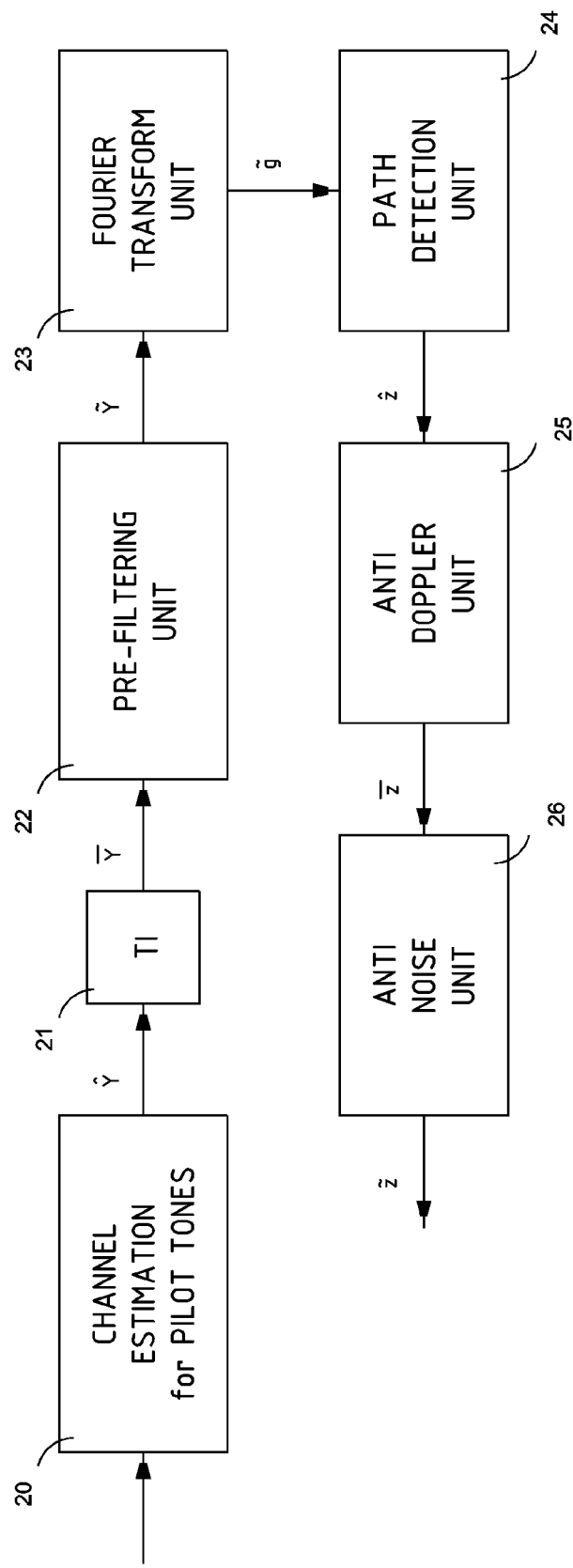
FIG. 7 shows, in a schematic block fashion, one possible way to organize the processing architecture.
Figure 8:
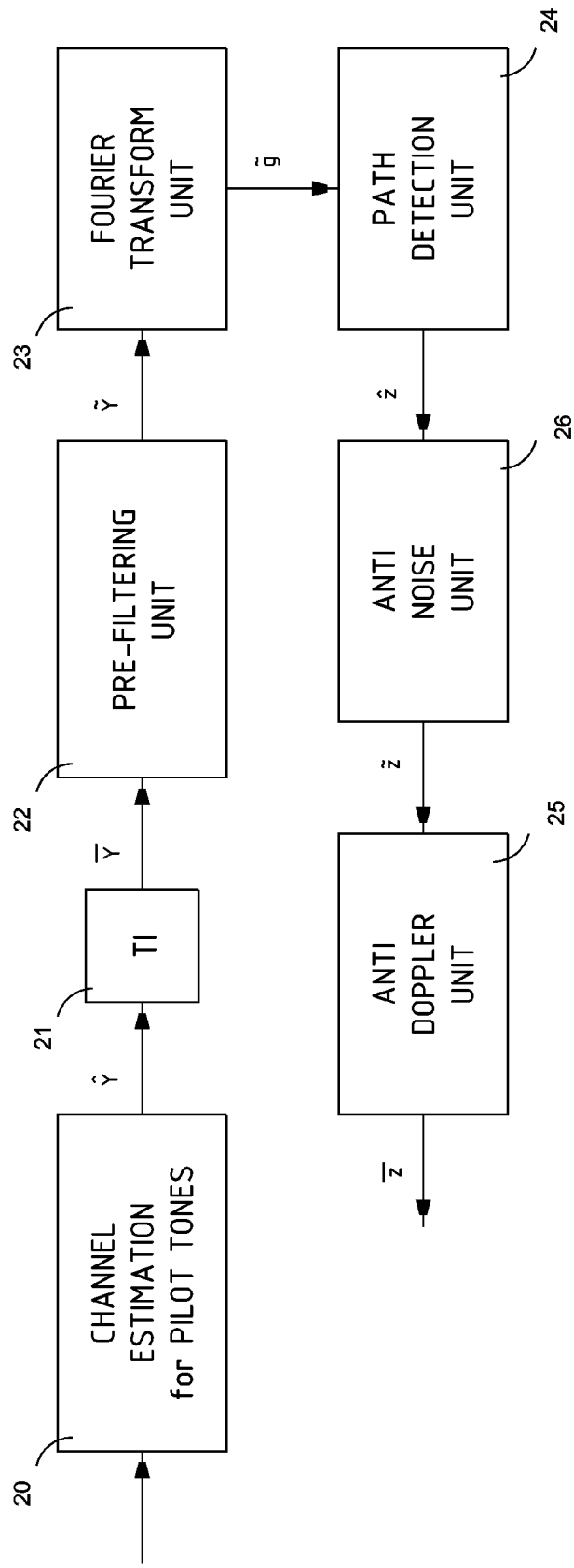
FIG. 8 shows, in a schematic block fashion, one possible way to organize the processing architecture. The ordering of the units can change, FIG. 7 and FIG. 8 two different ways to organize the processing architecture.

FIG. 7 shows, in a schematic block fashion, the functioning of the invention. Block 20 represents a unit of estimation of the channel response for pilots position of a given OFDM frame. According to the implementations, the unit 20 and other blocks in the figures may represent hardware elements dedicated to the channel estimation for pilots, or software resources executing on a signal processor programmed for the same task. It is also conceivable that some units, while being logically separate and represented as distinct block in the schematics and in the description, share or pool some of their resources in practical embodiments of the invention. The processing chain of FIG. 7 can replace the channel estimate units of FIG. 3, or it can be used in parallel to time- and frequency-interpolation units as in FIG. 3, to correct the channel estimate and control time interpolation, as it will be explained later.

The output of block 20 for the u-th OFDM frame will be denoted by $\hat{Y}(u)$, it can be obtained using different known techniques: LS, MMSE, SVD, etc.

In an example, block 20 aims at estimating the $\bar{H}_n(u)$ for all data cells. To this end, a least square frequency domain estimate is first obtained on pilot cells by dividing the received cells by the transmitted pilots, i.e.

$$\tilde{H}_{nS_B+zS}(qZ+z) = \frac{R_{nS_B+zS}(qZ+z)}{X_{nS_B+zS}(qZ+z)} \quad (10)$$

$$= \bar{H}_{nS_B+zS}(qZ+z) + \bar{W}_{nS_B+zS}(qZ+z),$$

where n=0, 1, ..., L−1 and z=0, 1, ..., Z−1. It can be assumed that pilot cells have unitary amplitude, i.e. $|X_n(u)|=1$, thus the noise/ICI term $\bar{W}_{nS_B+zS}(qZ+z)$ has variance $\sigma_w^2 + \sigma_I^2$.

It is considered here, for the sake of a simpler implementation, that interpolation is obtained in two steps, as the cascade of time interpolation (TI) followed by frequency interpolation (FI) according to FIG. 3. The signal $\hat{y}(u)$ can be represented in following vector form:

$$\hat{Y}(u) = [\hat{H}_0(u); \ldots; \hat{H}_{L_S-1}(u)] \quad (11)$$

where $\hat{H}_n(u)$ is the channel estimated for the $p_n(u)$-th pilot tone.

The Time Interpolation unit 21 performs time interpolation. The process is performed using $\hat{Y}(u)$ associated to different OFDM frames. The output of the block 21 is denoted by $\overline{Y}$. $\overline{Y}$ is the channel estimated every T sub-carriers. Considering the pilots pattern reported in FIG. 4 the minimum achievable T is $S_B/Z$.

$\overline{Y}$ can be represented by the following row vector:

$$\overline{Y} = [\overline{H}_0; \ldots; \overline{H}_{L_T-1}], \quad (12)$$

where $L_T$ is the number of pilot tones for which the Time Interpolation has been performed.

Time interpolation can be modelled considering $p_H$ and $|p_L|$ OFDM symbols before and after that on which interpolation is performed, respectively. The interpolation coefficients are $\alpha_p(z)$, $p=p_L$, $p_L+1, \ldots, p_H-1, p_H$, where $p_H > p_L$. Hence, TI is defined as $$\tilde{G}_{nS_B+sS}(qZ+z) = \sum_{p=p_L}^{p_H} \alpha_p(z) \tilde{H}_{nS_B+sS}(qZ + \zeta_{z,s} + pZ), \quad (13)$$

where the function $\zeta_{z,s}$ defines which pilots are used for interpolation. For example, setting $\zeta_{z,s}=s$, and $p_L=p_H=0$, interpolation is performed using only the symbol nearest to $zZ+z$, irrespective of the fact that the used symbol is in the past or in the future. On the other hand, by setting $$\zeta_{z,s} = \begin{cases} s, & z \geq s \\ s-Z, & z < s, \end{cases} \quad (14)$$

when $p_L=p_H=0$ we always consider the previous OFDM symbol for interpolation. In other words, when $z \geq s$, the index of the previous OFDM symbol, with respect to current $qZ+z$, having a pilot at cell $nS_B+sS$, has index $qZ+s$. In the latter case instead, the previous symbol has index $(q-1)Z+s$.

Preferably, the signal $\overline{Y}$ is processed by the Pre-filtering Unit 22. The Pre-filtering Unit multiply each element of the $\overline{Y}$ signal by a precomputed complex value. The output of the block 22 is denote by $\hat{Y}$. Let $\tilde{H}_i$ be the generic element of the $\hat{Y}$ signal, it is computed by the Pre-filtering Unit using the following equation:

$$\tilde{H}_i = b_i \overline{H}_i \, i=0, \ldots, L_T-1 \quad (15)$$

The set $b_0, \ldots, b_{L_T-1}$ is a set of complex coefficients. This set can be precomputed or/and it can be dynamically computed by the system and/or it can be selected among a few precomputed sets.

Windowing on the estimated CIR is performed to reduce noise. For example, if CIR is shorter than the number of time interpolated carriers, windowing may be implemented by an inverse DFT on $\{\tilde{G}_{nS_B+sS}(qZ+z)\}$ and by setting to zero all taps above a given index. More sophisticated approaches can also be derived when the power profile of the channel is known. Windowing is providing a significant gain in channel estimation. However, for proper windowing, a correct knowledge of the actual CIR duration is needed. In fact, underestimating of the duration would result in the cancellation of channel taps by the window and therefore an error in the resulting channel frequency response estimate. On the other hand, overestimating the duration results in a less effective windowing, as less noise and interference are nulled.

The purpose of the pre-filtering unit 22 is to change the intensity profile of the non-desired peaks artificially generated after performing a discrete Fourier transform on a truncated signal (the signal to be processed is indeed initially observed through a rectangular window), while leaving the peaks of interest slightly affected (these peaks will be enlarged and attenuated). From a practical standpoint, this unit array-multiplies the signal to be processed with a sequence of coefficients, which can be pre-defined or calculated in real-time when needed.

One possible weighting coefficient set that can be used in this invention is the well-known windowing function called the Blackman window. Like any of the commonly used windowing functions, its coefficients are real-valued, symmetrical with respect to the middle of the set and approach zero at both edges of the set. It is used to smooth out the discontinuities at the beginning and at the end of the signal to be Fourier transformed. The Blackman window offers a good trade-off between main lobe width (that is, the enlargement of the peak of interest) and side lobe peak level attenuation, thereby providing us with the resolution needed to separate the path peaks. Its equation is given below:

$$b_i(n) = a_0 - a_1 \cos\left(\frac{2\pi i}{L_T - 1}\right) + a_2 \cos\left(\frac{4\pi i}{L_T - 1}\right) \quad (16)$$

with $a_0=(1-\alpha)/2$, $a_1=1/2$ and $a_2=\alpha/2$ with $\alpha=0.16$, $i=0 \ldots (L_T-1)$ The output of Pre-Filtering Unit is processed by the Fourier Transform Unit (FTU) 23 that performs a Fourier Transform on $\tilde{H}$, the output of such Fourier Transform will be denoted by $\tilde{g}$. $\tilde{g}$ is the (preliminary) raw estimate of the Channel Impulse Response performed by this invention.

The Fourier Transform can be implemented using different techniques, such as, for example, the well known Fast Fourier transform (FFT), which is an optimized implementation of the Discrete Fourier Transform (DFT).

Assume a DFT is computed, the $\tilde{g}$ signal can be rewritten in a vector form as follows:

$$\tilde{g} = [\tilde{g}_0; \ldots; \tilde{g}_{C-1}]. \quad (17)$$

In the absence of any noise and for a time-invariant channel only a sub-set of $\tilde{g}$, (this sub-set of no null elements) is generated by channel paths.

Each physical channel path can generate one or more non-zero elements in the $\tilde{g}$ signal and then if follows that.

$$\tilde{g}_l = \begin{cases} h_l \neq 0 & l \in G \\ 0 & \text{otherwise,} \end{cases} \quad (18)$$

where G is the set of the non-zero elements induced by channel paths.

In order to analyze the error introduced by TI when the channel is time-varying, we consider the CIR estimate obtained after the C-size IDFT of the time interpolated frequency response estimate $\tilde{G}_{nS}(u)$, i.e.

$$\tilde{g}_l(u) = \frac{\sqrt{N}}{C} \sum_{n=0}^{C-1} \tilde{G}_{nS}(u) e^{2\pi j \frac{ln}{C}}, \quad (19)$$

$l=0, 1, \ldots, C-1$, where the factor $\sqrt{N}/C$ ensures $\tilde{g}_l(u)=\tilde{h}_l(u)$, for $p_L=p_H=0$, $\alpha_p(z)=1$, in the absence of noise and for time-invariant channels. Considering a time-invariant channel and observing that $G=[0, \ldots, L-1]$, $\tilde{g}_l(u)$ is a noisy version of the CIR for $l=0, 1, \ldots, L-1$, while it contains only noise outside the duration of CIR, i.e.

$$\tilde{g}_l(u) = \begin{cases} \bar{h}_l(u) + \tilde{w}_l(u), & l = 0, 1, \ldots, L-1, \\ \tilde{w}_l(u) & \text{otherwise,} \end{cases} \quad (20)$$

where $\tilde{w}_l(qZ+z)$ is the noise term whose variance, from (13) and (19), is $$\sigma_w^2(z) = E[\tilde{w}_l(qZ+z)] = \frac{N}{C}(\sigma_w^2 + \sigma_I^2) \sum_{p=p_L}^{p_H} \alpha_p(z)^2. \quad (21)$$

However, when the channel is time-varying, and TI is not ideal, aliases in the CIR estimate arise since (13) turns out to be the sum of DFTs of different CIRs. In fact, from (19) we obtain $$\tilde{g}_{kL_B+l}(u) = \frac{\sqrt{N}}{Z} \sum_{s=0}^{Z-1} e^{2\pi j \frac{(kL_B+l)s}{C}} \frac{1}{L_B} \sum_{n=0}^{L_B-1} \tilde{G}_{nS_B+sS}(u) e^{2\pi j \frac{(kL_B+l)n}{L_B}}. \quad (22)$$

with k=0, 1, ..., Z−1 and l=0, 1, ..., $L_B$−1. Using (13) and (8) we have $$\tilde{g}_{kL_B+l}(qZ+z) = \quad (23)$$

$$\frac{1}{Z} \sum_{p=p_L}^{p_H} \alpha_p(z) \sum_{m=0}^{Z-1} \sum_{s=0}^{Z-1} e^{2\pi j \frac{(k-m)s}{Z}} \bar{h}_{mL_B+l}(qZ + \zeta_{z,s} + pZ) + \tilde{w}_{kL_B+l}(qZ+Z),$$

where l=0, 1, ..., $L_B$−1 and k=0, 1, ..., Z−1. For a time-varying channel, (23) shows that aliases arise in the time interpolated CIR, unless the combining coefficients are properly chosen. Indeed, absence of aliases in a time-varying scenario is ensured only when $p_H = -p_L = \infty$ and the interpolating coefficients are a sinc function.

For a time-invariant channel, but in presence of noise, each element $\tilde{g}$ is affected by an incertitude. This is why Eq. (18) becomes:

$$\tilde{g}_l = \begin{cases} h_l \neq 0 + \tilde{w}_l & l \in G \\ \tilde{w}_l & \text{otherwise,} \end{cases} \quad (24)$$

where $v_c$ is the additive noise and then the incertitude on $\tilde{g}$.

From a statistical point of view, the elements of G are significantly larger than the others, and the receiver of the invention preferably includes a Path Detection Unit (PDU) to detect them. Taking into account only the value of $\tilde{g}$ significantly different from zero the Path Detection unit detects channel paths and their delays.

Figure 11:
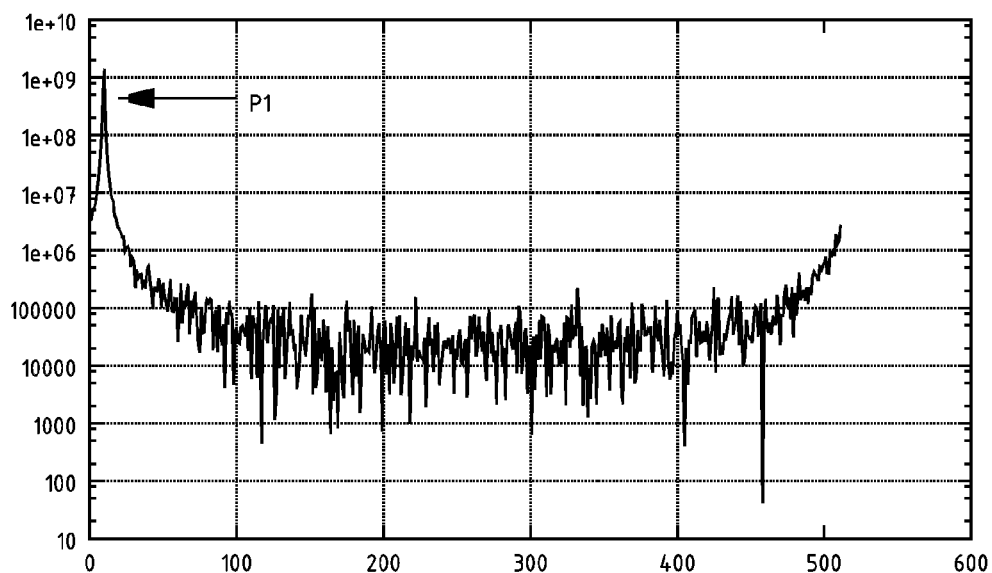
FIG. 11 and FIG. 12 show FFT diagrams according to one aspect of the invention.
Figure 12:
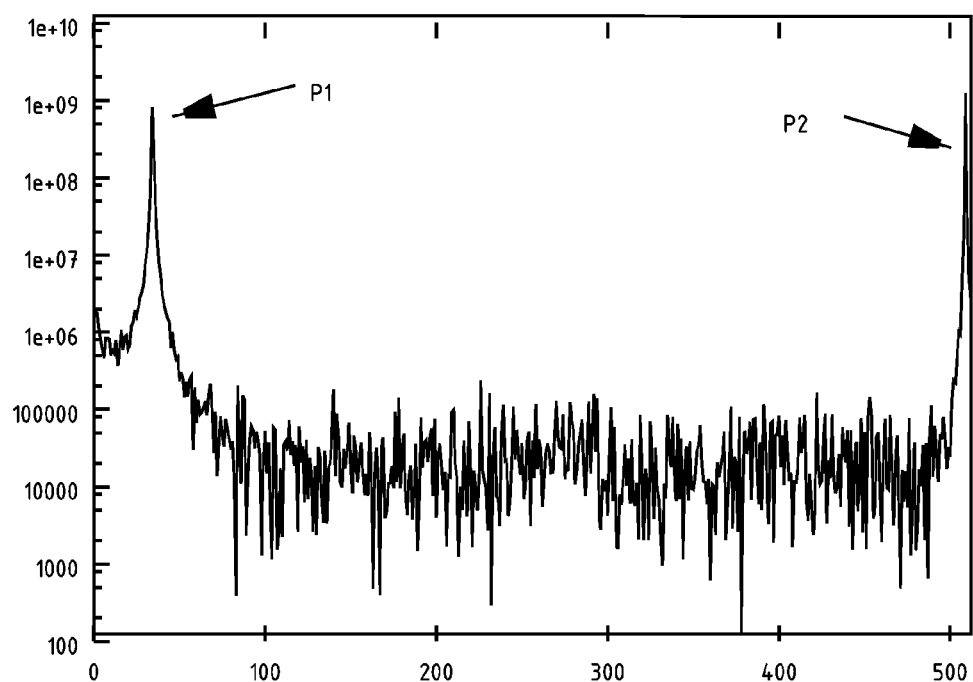

FIG. 11 and FIG. 12 show square values for a FFT having 512 samples. In FIG. 11 we can identify only one path, P1, while in FIG. 12 there are two paths, P1 and P2.

The PDU 24 identifies the paths of interest, for example by comparing $\tilde{g}$ with a threshold. Every value larger than a given threshold is taken into account and then considered as a path. The threshold could be a fixed value, or a dynamic threshold adapted to any given environment, for example determined on the base of the maximum of $\tilde{g}$ or of the noise present in the system, or a combination of the above.

The output of PDU 24, denoted by $\hat{z}$, is the information relative to paths detected by PDU. $\hat{z}$ summarizes the information about the most significant characteristics of detected paths such as: delay, amplitude, etc.

In a time-varying environment the outputs $\tilde{g}$ and $\hat{z}$ can be affected by significant errors. These errors are mainly introduced by TI. Considering a Time Interpolation described by FIG. 5 there are extra errors at all the position $c+iL_B$ for all c $\in$ G, i=1, ..., Z−1 and $L_B$=C/Z, see FIG. 9. For a time-varying channel, FIG. 9 shows that aliasing arises in the Channel Impulse Response $\tilde{g}$.

Figure 9:
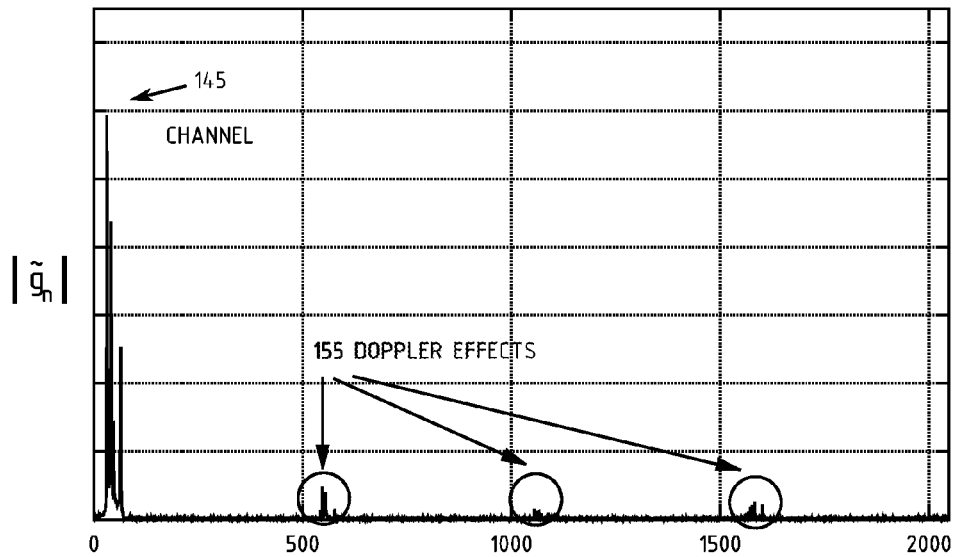
FIG. 9 illustrates the result of Doppler effect on the output of block 23 of FIG. 7.

FIG. 9 shows the vector $\tilde{g}$ for a time-varying channel. The samples 145 correspond to physical paths, while the samples marked 155 do not correspond to any physical path; they are affected by the noise present in the system and by an extra error introduced by Time Interpolation. The error introduced by Time Interpolation makes that these samples can be mistaken for samples generated by physical paths. This is why in a time-varying environment, their detection and compensation become very important.

These extra errors modify the description of the signal $\tilde{g}$ proposed in Eq. (24), which then becomes:

$$\tilde{g}_l = \begin{cases} \bar{h}_l \neq 0 + \tilde{w}_l + t_l & l \in G \\ \tilde{w}_l + t_l & \text{otherwise,} \end{cases} \quad (25)$$

where $t_l$ denotes the error introduced by TI. In the following the noise introduce by TI will be also named t-noise.

Note that most of the $t_c$ elements are equal to zero. The generic $t_c$ can be different to zero for all the indices generated by the set G circularly shifted by $L_B$, ..., $(Z-1)L_B$. The G circularly shifted by $L_B$ generates the following set on indices:

$$G_{L_B} = \{n | n = \text{mod}(l+L_B; C); l \in G\}, \quad (26)$$

where mod($\bullet$; C) denotes operation in modulo C.

Figure 10:
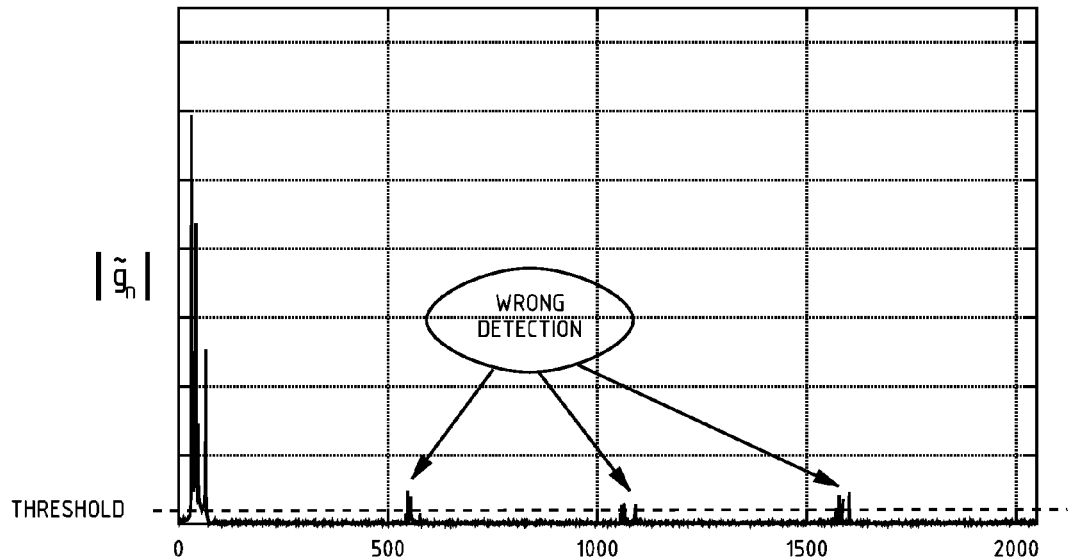
FIG. 10 shows a possible wrong detection performed by block 24 reported in FIG. 7.

The noise introduced by TI can generate a wrong detection in the Path Detection Unit. FIG. 10 shows the detection performed by the Path Detection Unit using a given threshold. Note that using thresholds smaller than t-noise there are wrong detection in Z−1 zones, which correspond to the sets: $G_{L_B}, G_{2L_B}, \ldots, G_{(Z-1)L_B}$.

Considering, for the sake of simplicity, G=[0, ..., L−1], the presence of aliases in the estimated CIR can be seen as an estimation error, which can be written as $$\delta_l(u) = \begin{cases} \tilde{g}_l(u) - \bar{h}_l(u), & l = 0, 1, \ldots, L-1 \\ \tilde{g}_l(u) & l = L, L+1, \ldots, C-1. \end{cases} \quad (27)$$

We are interested in computing the average estimation error power $\beta_l(z) = E[|\delta_l(qZ+z)|^2]$ and the compound error power $$E = \frac{1}{CZ} \sum_{l=0}^{C-1} \sum_{z=0}^{Z-1} \beta_l(z). \quad (28)$$

In the Appendix, the closed form expression of $\beta_l(z)$ is derived. For a time-invariant channel we have $E = \sigma_w^2 \square$. Moreover, by the Parseval theorem E is also the average error power of the frequency domain channel estimate after TI and FI. When windowing is included, the part of $\tilde{g}_l(qZ+z)$ that does not contain CIR is set to zero. The compound error power then becomes $$E_w = \frac{1}{CZ}\sum_{l=0}^{L-1}\sum_{z=0}^{Z-1}\beta_l(z), \quad (29)$$

where the first sum is now limited to L−1 instead of C−1. For a time-invariant channel we have $E_w=L\sigma_w^2/C$ with a reduction of $10\log_{10}(C/L)$ dB with respect to E.

The wrong detections can be avoided increasing the threshold used by the Path Detection Unit or filtering the output of the Path Detection Unit. In both cases the detection of t-noise is necessary. According to the invention, the receiver includes an Anti Doppler Unit 25, whose goals are to detect the t-noise and to reduce its effects on Channel Profile Estimation. For any path detected by block 24 the Anti-Doppler Unit looks for the presence of its aliases or replica at positions $+L_B$, $+2L_B, \ldots$ and $+(Z-1)L_B$.

The CIR (Channel Impulse Response) estimation can be declared affected by t-noise if one, more than one or all the replicas are detected.

Assume that Z=4; C=2048 and $L_B$=514. In case of t-noise, detection the Anti-Doppler-Unit can decide to increase the threshold used for the detection in the block 24 or to delete a set of paths because considered t-noise. This second solution permits to avoid t-noise effects without sensitivity loss for path detection.

The system of the invention is further arranged to control the time interpolation in order to avoid t-noise, if the anti-Doppler unit 25 detects its presence. In particular, the detection of t-noise could, in a variant, cause the switch off or the bypass of the time interpolation unit 21 of FIG. 3.

The removal of a path by $\hat{z}$ can be done following the principle that the samples of $\tilde{g}$ generated by a physical path are larger than the samples of a correspondent replica. This is why, assuming that there are four paths at the position: a, $a+L_B$, $a+2L_B$ and $a+3L_B$, having respectively amplitude $A_0$, $A_1$, $A_2$ and $A_3$, and assuming that $A_0$ is significantly larger than the others, it follows that the path at the position a has to be considered the only one to be generated by a physical echo, while the others are just one replica of it.

The output of the Anti Doppler Unit denoted by $\bar{z}$ is a signal containing all the information related to the paths detected by the Path Detection Unit and not considered generated by t-noise.

Figure 5:
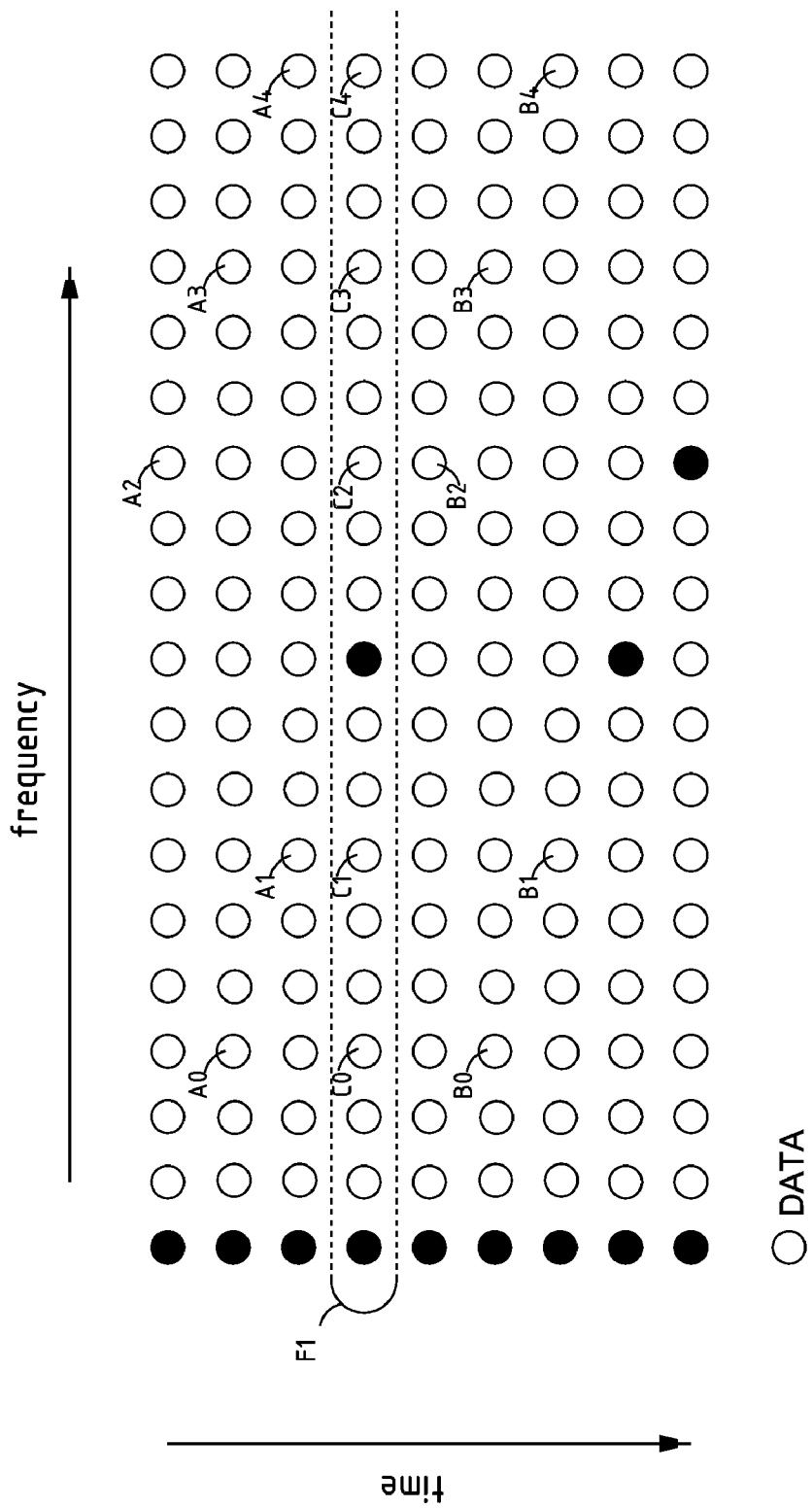
FIG. 5 reports in a schematic block fashion one possible Time Interpolation solution. This figure refers to Time Interpolation for the OFDM frame denoted by F1. Block-10 uses the channel estimation done at the position A0 and B0 to estimate the channel at the position C0. A1 and B1 are used to compute C1, A2 and B2 are used to compute C2, A3 and B3 are used to compute C3 and A4 and B4 are used to compute C4. This process can be easily extended to the others sub-carrier of F1 not report in this figure.
Figure 6:
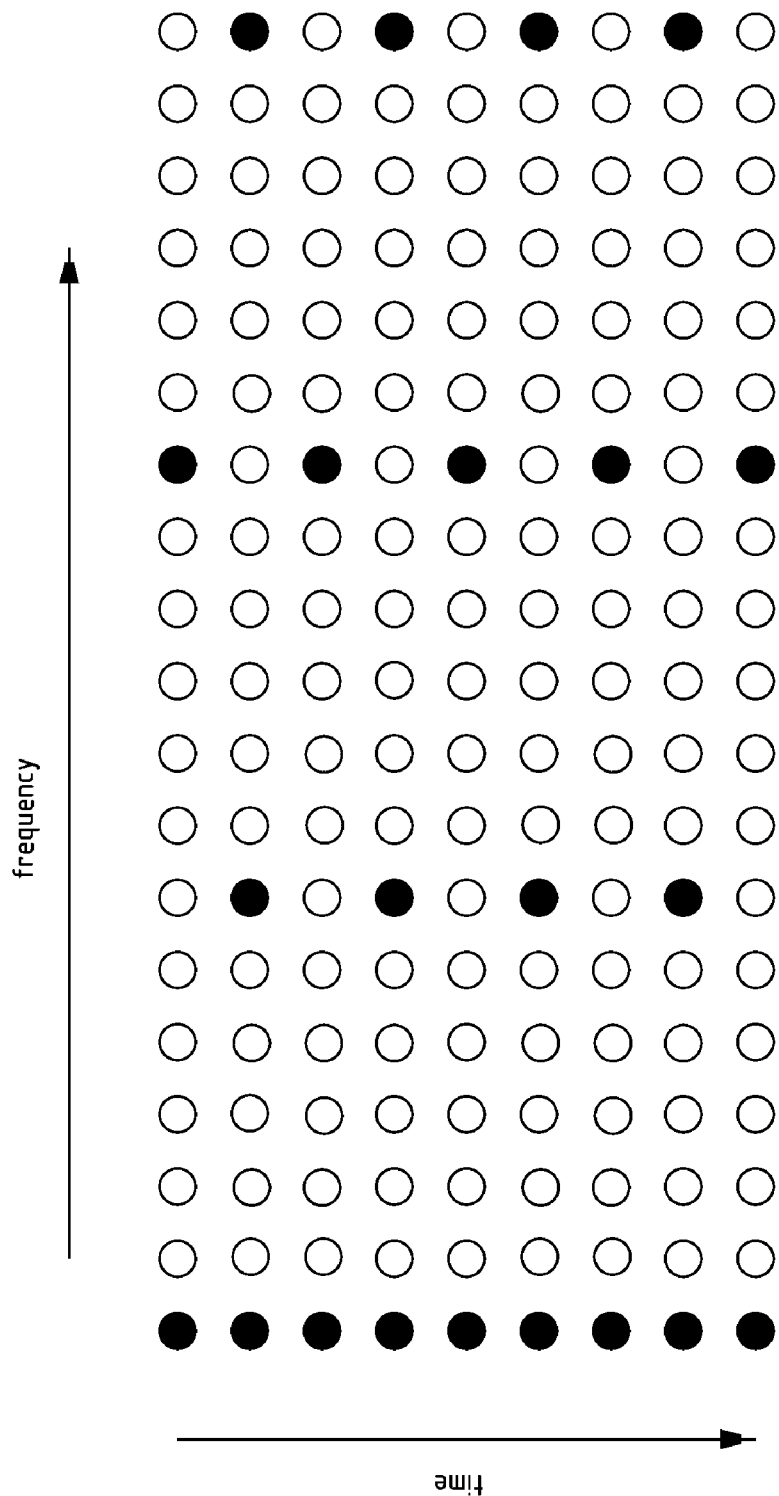
FIG. 6 shows one possible scattered pilot patterns for DVB-T2.

If we use a Time Interpolation processing different from the one described by FIG. 5, then the pattern of the t-noise can significantly changes.

Nevertheless, for a given Time Interpolation processing, it is always possible to pre-estimate the positions of the replicas generated by t-noise. This is why the processing performed by Anti Doppler unit 25 can be further generalized. For each path detected by block 24 the Anti-Doppler Unit 25 looks for the presence of its replica for a set of positions: $+L_1$, $+L_2, \ldots, +L_Q$, where the generic $L_i$ is a pre-computed value function on the processing implemented by all the previous blocks: 20, 21, 22, 23 and 24.

In a practical implementation, the output of each block reported in this invention cannot be considered error free. The errors introduced by any process can be seen as additive noise, which can be white or coloured. Anti Doppler unit 25 can be used even to delete any kind of coloured noise introduced by any unit of the signal processing chain. To this end the coloured noise has to be identified and characterized. The characterization consists in producing a good pattern $+L_1, \ldots +L_Q$ for the Anti Doppler Unit.

The goal of anti Doppler unit 25 is the detection and suppression of any sort of coloured noise present in $\hat{z}$.

The output of block 25 is then filtered by the Anti Noise Unit 26. This Unit observes the time evolution of the $\bar{z}$ and it detects all the errors that can be considered rare. Anti noise unit 26 observes a sequence of $\bar{z}$ signal. The k-th observation of the by $\bar{z}$ signal will be denoted by $\bar{z}(k)$. If one echo is present in $\bar{z}(k)$ but no more in different observations $\bar{z}(j)$, $j\neq k$, then such an echo can be considered a rare event and noise-generated.

Formally, the function and behaviour of the anti noise unit 26 can be described as follows: Channel duration can be estimated through $\tilde{g}_l(u)$ as derived in (19). However, the presence of aliases can lead to an erroneous estimate. On the other hand, if the channel is long, e.g. in a SFN scenario, we should not confuse long echoes with aliases. We propose an algorithm where aliases are detected, removed and lastly channel duration estimate is performed, thus allowing for possible long echoes to be detected.

For the first step of alias detection, since we do not know if estimated taps $l>L_B$ are due to the channel or its aliases, we consider only the most powerful taps with index $l\leq L_B$, assuming that these taps lead to most powerful aliases, i.e.

$$P_0=\{l:|\tilde{g}_l(u)|^2>\sigma_{min}^2, l=0,1,\ldots,L_B-1\}, \quad (30)$$

where $\sigma_{min}^2$ is a real positive parameter. Aliases, when present, will be on taps with indices belonging to sets $$P_k=\{l+kL_B|l\in P_0\}, k=1,2,\ldots,Z-1. \quad (31)$$

An estimate of the compound power of aliases relative to taps in the set $P_k$ is then obtained as $$\psi_k(u) = \sum_{l\in P_k}|\tilde{g}_l(u)|^2, k=1,2,\ldots,Z-1, \quad (32)$$

Detection of aliases follows on each replica, by performing (Z−1) tests with null hypothesis $H_0(u):\psi_k(u)\geq\psi_{min,k}$ and alternative hypothesis $H_1(u):\psi_k(u)w<\psi_{min,k}$. If more than G tests over (Z−1) are positive, i.e. more than G taps have an estimated energy larger than $\psi_{min,k}$, we decide that aliases are present and we force to zero all corresponding taps of the estimated CIR, setting $\tilde{g}_l(u)=0$, $l\in \overline{P}_k$. Lastly, the channel duration is established by finding the largest tap index corresponding to a square absolute channel value larger that $g_{min}^2$, $$\tilde{L}=\max\{l:|\tilde{g}_l(u)|^2\geq g_{min}^2\}. \quad (33)$$

Parameters Optimization

In order to determine the parameter $\psi_{min,k}$ for alias detection, we aim at minimizing the error probability $P_E$ of the compound alias test, which can be obtained from the error probability of each test $P_{E,k}$, k=1, 2, ..., Z−1, by enumerating all cases that lead to a detection error starting from errors on each test. In particular, we must have at least G tests in error to have a detection failure, hence, denoting with $\{G_u(G)\}$ are all the possible sets of at least G elements taken from $\{1, 2, \ldots, Z-1\}$ and $\overline{G}_u(G)=\{1, 2, \ldots, Z-1\}$, $G_u(G)$, we have $$P_E = 1 - \sum_u \left[ \prod_{k \in \bar{G}_u(G)} (1 - P_{E,k}) \right] \left[ \prod_{k \in G_u(G)} P_{E,k} \right]. \tag{34}$$

The minimum of the error probability for the compound test is achieved by minimizing the probability of each test.

The error probability of each test is the sum of the false alarm (FA) probability, i.e. the probability of declaring a mobility scenario when a static channel is present, and the miss detection (MD) probability, i.e. the probability of missing the presence of aliases averaged over channel realizations, so that $$P_{E,k} = P_{MD,k} + P_{FA,k}. \tag{35}$$

Adaptive TI with Known Channel Duration

Let us consider, the case when CIR length is less than the number of pilots per OFDM symbols, i.e. $L \leq L_B$. Although the channel can be estimated on a single OFDM symbol, for static channels TI is still advantageous as it reduces the estimation noise power. However, if time variations are fast enough and TI is not ideal, it is convenient to switch off TI when the additional error introduced by TI is excessive.

To this end, we perform a test on $\psi_k$ and, similarly for the detection of aliases, we switch off TI if $\psi_k > \psi_{TI,min,k}$ for at least G values of k. The error probability can be computed as in Section "parameters optimization" above, where the MD probability is computed in correspondence of a threshold frequency $f_D$ over which on average TI is worsening performance.

Numerical Simulations

TABLE 1

| Parameter | Value |
|---|---|
| OFDM symbol size (N) | 8192 |
| Pilot spacing along frequency axis ($S_B$) | 12 |
| Pilot spacing along time axis Z | 4 |
| Transmission symbol rate 1/T | 8 MHz |
| CP duration $L_{CP}$ | 2024 |
| Rms delay spread of a TU6 channel | $\tau_{rms} = 1.4$ |
| Delay between the two channels | $\delta_2 = 300$ |

We consider an OFDM transmission system in a DVB-T scenario, with parameters reported in Table 1. As channel model we consider SFN transmission with $N_{TX}$ transmitters having delay $\delta_n$, n=1, 2, ..., $N_{TX}$ with respect to the first transmitter (i.e. $\delta_1 = 0$), and relative average power n=1, 2, ..., $N_{TX}$ with respect to the first transmitter (i.e. $\zeta_1 = 1$). The channel of each transmitter is modelled with an exponentially decaying power profile with root mean square delay spread $\tau_{rms}$, so that we have $$\sigma_h^2(l) = \frac{1}{\omega} \sum_{n=1}^{N_{TX}} \sqrt{\xi_n} e^{-\frac{\tau_{rms}(l - \delta_n)}{T}}, \tag{36}$$

where $\omega = \sum_{l=0}^{I-1} \sigma_h^2(l)$ is a normalization factor ensuring average unitary channel power. In particular, we consider $N_{TX} = 2$ and mutual uniform random delay within the CP. Each transmitter-receiver link has a frequency selective fading channel as described in Section \ref{analysis}, with a root mean square delay spread of 1.4 T, describing a typically urban channel model, as TU6.

Figure 13:
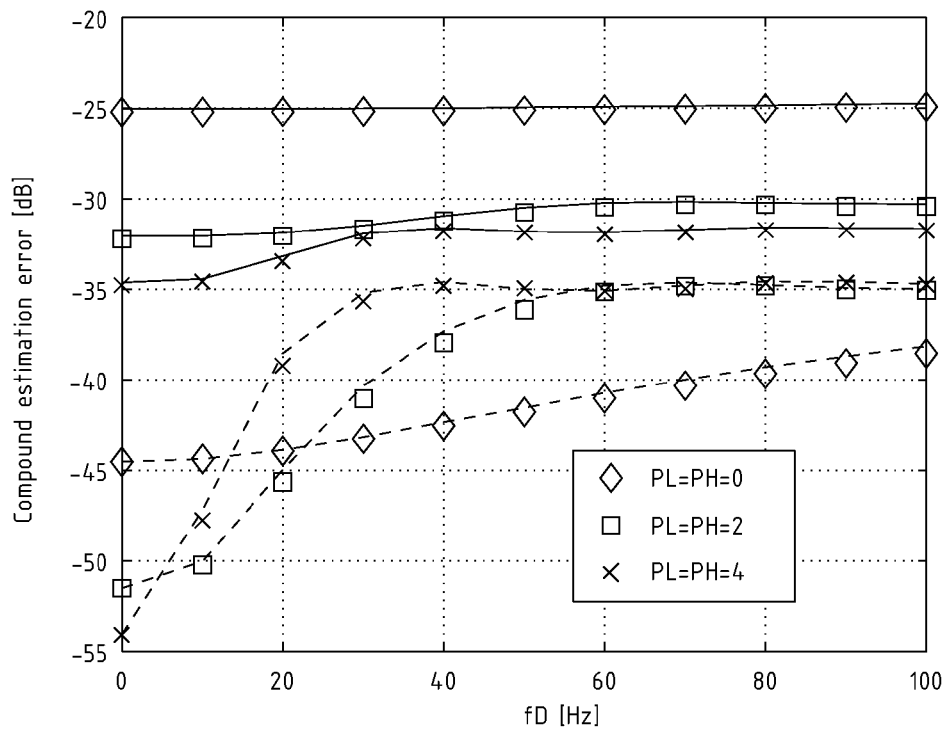
FIG. 13 shows the compound error power as a function of the maximum normalized Doppler frequency.

FIG. 13 shows the compound error power as a function of the maximum normalized Doppler frequency u, for a noise variance of $(\sigma_w^2)_{dB} = -30$ dB, an OFDM configuration as in the 8 k mode of the DVB-T standard, and TI parameters as detailed in Table 1. Considered interpolation parameters are $p_L = -p_H$, $p_H = 0, 2, 4$ and $\alpha_p(z) = (p_H - p_L + 1)^{-1}$. The figure shows both analytical results, obtained according to the derivations above presented, and numerical results, obtained by a symbol by symbol simulation of the system and time-varying channel on a symbol base. For $E_W$, we assumed to know perfectly the channel duration, thus using the perfect window. We observe a very accurate match between analytical and simulation results. Furthermore, from the figure we observe that $f_D$ has a significant impact on the performance, especially when windowing is used. Windowing has the potential of dramatically improving performance, but it relies on an accurate channel estimate, which can be obtained by the alias and Doppler detection method of the invention. For reference, a system without TI would provide a compound error of $(E^{(no\ TI)})_{dB} = 19.2$ dB. We observe that for some Doppler frequencies using a longer TI actually lowers the compound error, e.g. TI with $p_H = 4$ has a higher E than TI with $p_H = 2$ for $10 \leq f_D \leq 50$. Hence, in the case of high mobility, it may be advantageous to lower the order of the TI interpolator.

Figure 14:
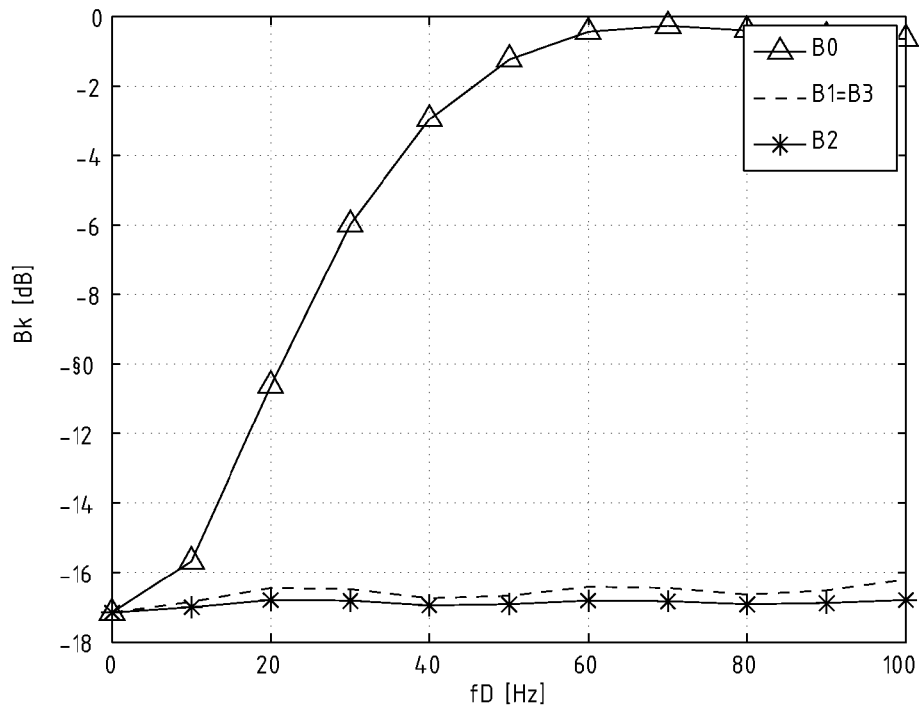
FIG. 14 shows the average error power for the Channel Impulse Response (CIR) and its aliases as a function of the Doppler frequency $f_D$ in simulated Urban Channel model.

The alias detection technique is based on the absolute value of the aliases arising due to suboptimal TI. For a TU6 channel with duration $L \leq L_B$ and $p_H = -p_L = 2$, FIG. 14 shows the average error power for the CIR and its aliases as a function of $f_D$, i.e.

$$B_k = \frac{1}{Z} \sum_{z=0}^{Z-1} \sum_{l=0}^{L-1} \beta_{kL_B + l}(z), k = 0, 1, \ldots, Z-1. \tag{37}$$

We observe that the main error power is concentrated on the CIR, i.e. on $B_0$. We further notice that $B_k$ for $k \geq 1$ is not monotonic with $f_D$ but exhibits an almost oscillating behaviour. This is related to the Jakes model and its particular time-domain correlation function.

Figure 15:
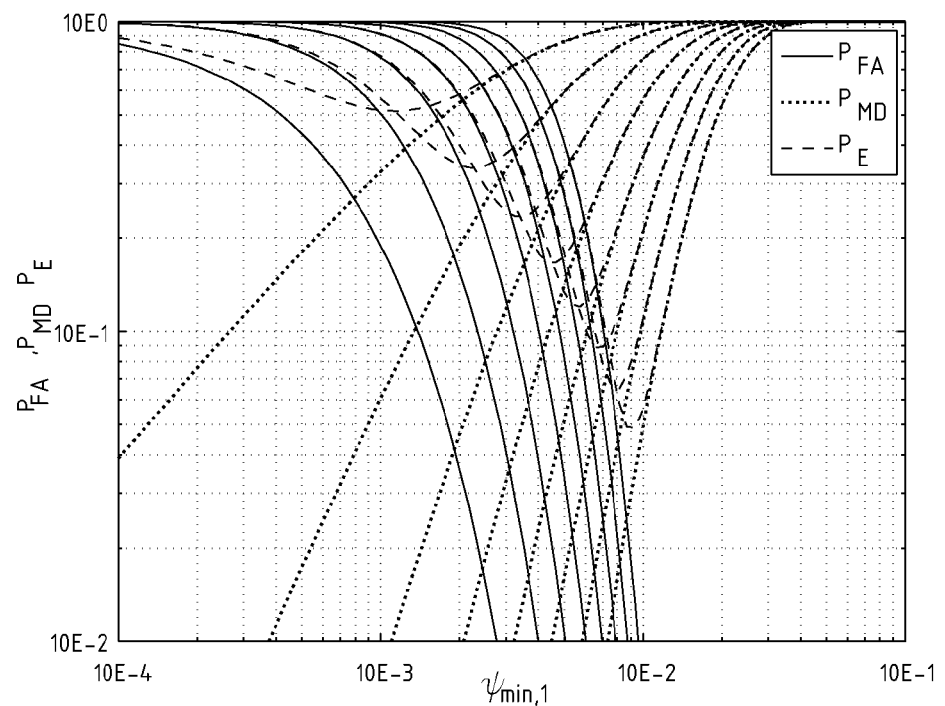
FIGS. 15 and 16 show the False Alarm (FA) probability, Miss Detection (MD) probability and minimum Error Probability ($P_E$) of the alias detection method as a function of $\psi_{min,1}$ and for values of $\|P_0\|$ ranging from 1 to 8.
Figure 16:
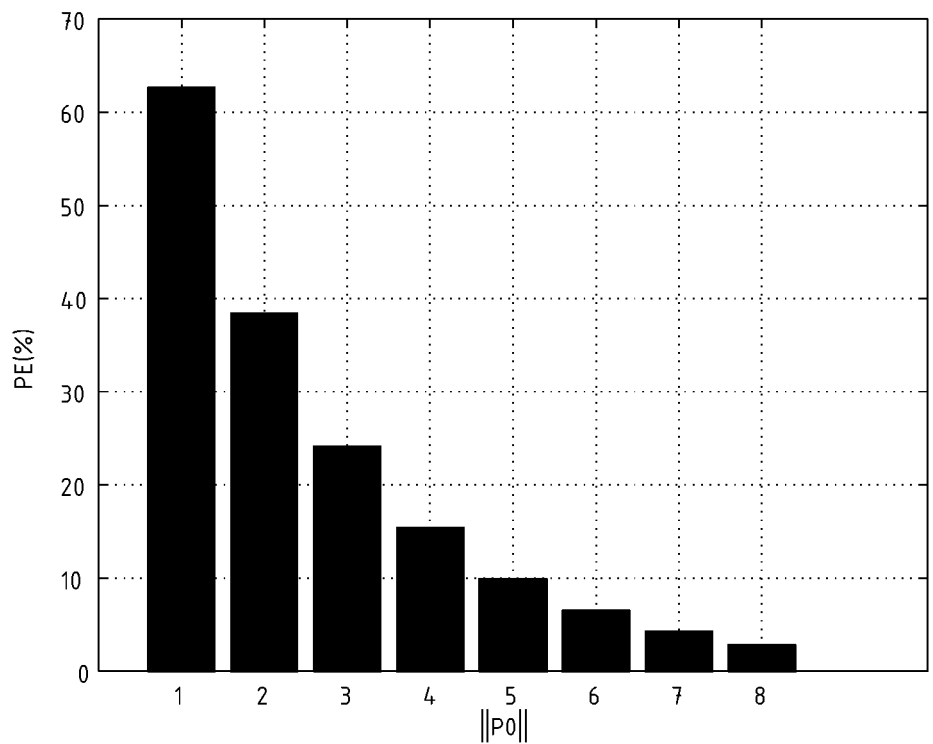

About the alias detection method, parameters must be chosen in order to achieve a given error probability. In particular, for the maximum tap selection we have to choose $\psi_{min,k}$ and the cardinality of FIG. 15 shows the FA, MD and error probabilities of the alias detection method as a function of $\psi_{min,1}$ and for values of $\|P_0\|$ ranging from 1 to 8. We assumed $\sigma_{min}^2 = 1$. We observe that all probabilities are decreasing for increasing $\|P_0\|$ and that $P_{FA,1}$ is decreasing with $\psi_{min}$ while $P_{MD,1}$ is increasing with $\psi_{min}$. By picking the value of $\psi_{min,1}$ corresponding to the minimum error probability $P_{E,1}$ we obtain $\overline{\psi}_{min,k}$. The procedure is repeated on $\psi_{min,k}$ for k=2, 3, ..., Z−1 and the compound error probability $P_E$ is computed from (34). We considered G=3 for the hypothesis testing. The resulting $P_E$ for the optimized values $\{\overline{\psi}_{min,k}\}$ is shown in FIG. 16. We note an exponentially decreasing error probability as a function of $\|P_0\|$. Note that the reported $P_E$ has been derived in the worst case of $|\tilde{g}(u)|^2 = \sigma_{min}^2$ for $1 \square P_0$, and that even in this condition we obtain $P_E$ of the order of 10\ % with only $\|P_0\|=2$ and of the order of 1% with $\|P_0\|=5$. Thus, in a real scenario where $|\tilde{g}(u)|$ can be larger than $\sigma_{min}^2$ when $1 \in P_0$ we expect an even better performance.

Figure 17:
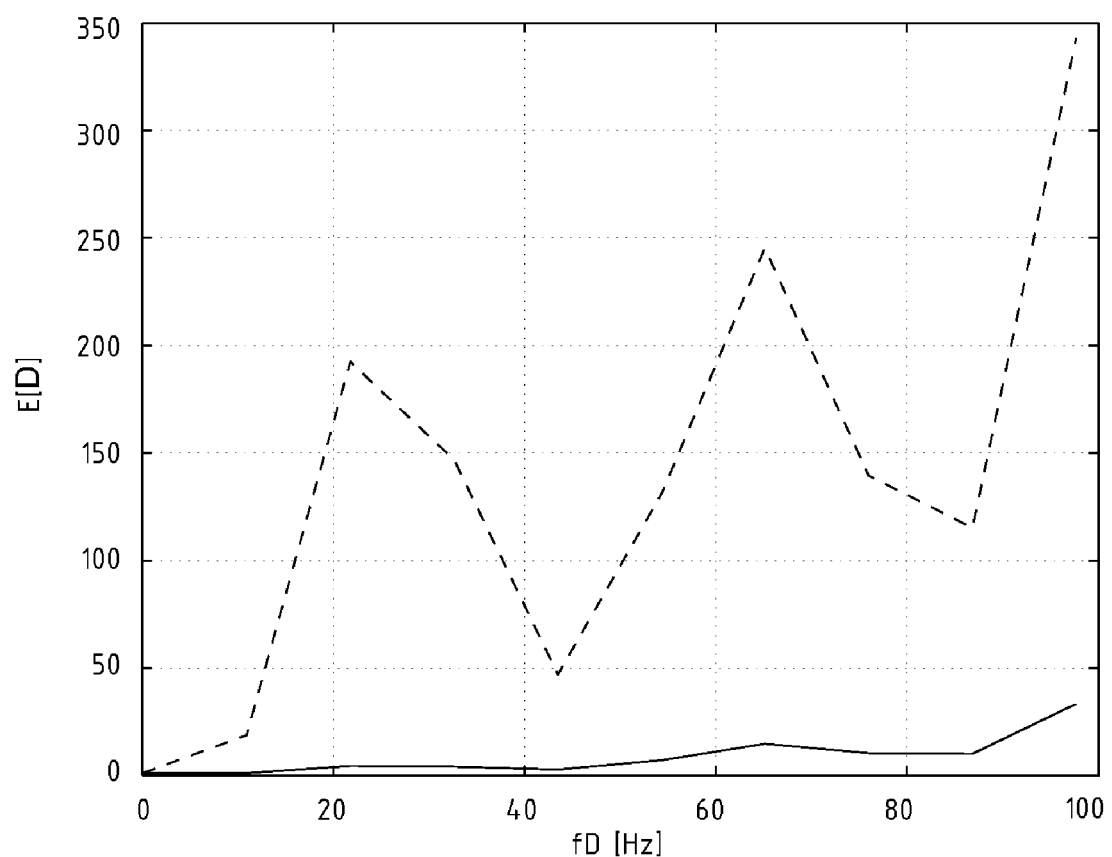
FIG. 17 shows the average error $E[\Delta]$ as a function of the maximum normalized Doppler frequency $f_D$.

In order to evaluate the performance of the channel duration estimator, we consider the absolute error $$\Delta = |\tilde{L} - L|, \tag{38}$$

and in FIG. 17 we report we show its average $E[\Delta]$ as a function of the maximum normalized Doppler frequency $Tf_D$. We selected $g_{min} = 0.1$ and the values of $\psi_{min,k}$ optimized as described above. We observe that the alias detection mechanism yields a significantly reduced average absolute error in the estimation of the channel length. Indeed, the average duration error is increasing with $f_D$ both with and without the detection mechanism, however the slopes of the two curves are different, showing that the detection mechanism is effective even at high Doppler frequencies. Note that $E[\Delta]$ has not a monotonic behaviour with respect to $f_D$, since as we have seen in FIG. 14, the error power on aliases is not strictly increasing with $f_D$ for the considered scenario of Jakes model.

For a better understanding the impact of the proposed technique on the system performance, FIG. 18 shows the mass distribution of $\Delta$ for a system with and without alias detection, $f_D$=30 Hz and a single TU6 channel ($N_{TX}$=1). Most of the errors are concentrated around $kL_B$, with k=0, 1, ..., Z−1, since the detector erroneously accounts the aliases as true channel taps. Hence, FIG. 18 shows only the probability of $\Delta = kL_B$. We observe that when alias detection is not included, the length of the channel is over estimated as the aliases are interpreted as channel. Indeed, since errors on channel estimation are grouped around $kL_B$, a significant worsening of performance (in terms of channel estimation error) is exhibited, due to erroneous windowing. Alias detection avoids this phenomenon, limiting errors on duration estimate on the last taps of the effective channel, in this case with tap indices $0 \leq l \leq L_B - 1$. Lastly, note that since the second alias (k=2) provides a lower B (see FIG. 16, also in the detection process, fewer errors occur on the second alias.

The invention claimed is:

1. A method for processing OFDM signals comprising the steps of
   estimating a channel response from pilot tones;
   interpolating a response of individual pilot tones to estimate the channel response at sub-carriers for which no pilot tones are present;
   determining a raw channel profile estimation with a Fourier transform of the interpolated channel response;
   obtaining estimates of compound power relative to taps in the raw channel profile estimate; and
   deciding whether certain taps in the raw channel profile estimate are noise introduced by said step of interpolating the response of individual pilot tones, based on said estimates of compound power.

2. The method of claim 1, including a step of forcing to zero the taps for which said step of deciding provides an affirmative answer.

3. The method of claim 1, wherein the step of correcting the estimate of the channel duration includes a step of finding the largest tap corresponding to a square absolute channel value larger than a set threshold.

4. The method of claim 1, wherein the step of deciding includes the step of comparing said estimates of compound power with a predetermined parameter.

5. The method of claim 1, carried out in parallel to time- and frequency-interpolation, wherein the results of said step of deciding is used to correct a channel estimate and control the time interpolation.

6. A signal processor for processing OFDM signals in a receiver, comprising:
   a channel estimation unit for determining an estimation of a channel response, from known pilot tones in the OFDM signal;
   a time interpolator to perform time interpolation of the channel response at sub-carriers for which no pilot tones are present;
   a Fourier transform unit arranged to perform a Fourier Transform on the interpolated channel response to determine a raw channel profile estimate;
   an anti-Doppler unit for obtaining estimates of compound power relative to taps in the raw channel profile estimate; and
   an anti Noise Unit arranged to decide whether certain taps in the raw channel profile estimate are noise introduced by said step of interpolating the response of individual pilot tones, based on said estimates of compound power.

* * * * *

UNITED STATES PATENT AND TRADEMARK OFFICE
CERTIFICATE OF CORRECTION

PATENT NO. : 8,351,526 B2
APPLICATION NO. : 13/182762
DATED : January 8, 2013
INVENTOR(S) : Butussi et al.

Page 1 of 1

It is certified that error appears in the above-identified patent and that said Letters Patent is hereby corrected as shown below:

Title Page

In the Inventors, please replace the name of the second named inventor "Stevano" with -- Stefano --.

In the Specification

Column 6, line 54, please replace the phrase "L-1" with -- $L_s$-1 --.

Column 9, line 56, please add the number -- 24 -- after the word "(PDU)".

Column 13, line 48, please replace the letter "n" with -- $\xi n$ --.

Column 13, line 67, please replace the letter "u" with -- $f_D T$ --.

Column 14, line 55, please replace "□" with -- $\epsilon$ --.

Signed and Sealed this
Twenty-third Day of April, 2013

Teresa Stanek Rea
*Acting Director of the United States Patent and Trademark Office*